United States Patent
Lee

(10) Patent No.: US 9,817,488 B2
(45) Date of Patent: Nov. 14, 2017

(54) OPTICAL NAVIGATION DEVICE AND RELATED AUTOMATIC MAGNIFICATION ADJUSTING METHOD

(71) Applicant: PixArt Imaging (Penang) SDN. BHD., Penang (MY)

(72) Inventor: Sai Mun Lee, Penang (MY)

(73) Assignee: PixArt Imaging (Penang) SDN. BHD., Penang (MY)

(*) Notice: Subject to any disclaimer, the term of this patent is extended or adjusted under 35 U.S.C. 154(b) by 190 days.

(21) Appl. No.: 14/601,240

(22) Filed: Jan. 21, 2015

(65) Prior Publication Data
US 2016/0209935 A1    Jul. 21, 2016

(51) Int. Cl.
G06F 3/0354    (2013.01)
G06F 3/03      (2006.01)

(52) U.S. Cl.
CPC ........ G06F 3/03543 (2013.01); G06F 3/0317 (2013.01)

(58) Field of Classification Search
CPC .. G06F 3/0317; G06F 3/03543; G06F 3/0421; G06F 3/0312; G06F 3/03547
See application file for complete search history.

(56) References Cited

U.S. PATENT DOCUMENTS

| | | | | |
|---|---|---|---|---|
| 6,246,482 B1 * | 6/2001 | Kinrot | ...................... | G01D 5/26 356/499 |
| 6,248,991 B1 * | 6/2001 | Chen | .................... | H04N 5/3575 250/208.1 |
| 7,746,477 B1 * | 6/2010 | Huber | ................... | G06F 3/0317 345/166 |
| 2004/0227954 A1 * | 11/2004 | Xie | ..................... | G06F 3/03543 356/498 |
| 2005/0139944 A1 * | 6/2005 | Lin | ..................... | G06F 3/03543 257/432 |
| 2005/0206614 A1 * | 9/2005 | Brosnan | ................ | G06F 3/0317 345/156 |
| 2005/0206617 A1 * | 9/2005 | Moyer | .................. | G06F 3/0317 345/163 |
| 2006/0044267 A1 * | 3/2006 | Xie | ......................... | G06F 3/038 345/157 |
| 2007/0152966 A1 * | 7/2007 | Krah | ....................... | G06F 3/016 345/163 |
| 2008/0043223 A1 * | 2/2008 | Kwak | ................... | G06F 3/0317 356/72 |

(Continued)

Primary Examiner — Jose Soto Lopez
(74) Attorney, Agent, or Firm — Winston Hsu

(57) ABSTRACT

An automatic magnification adjusting method is applied to an optical navigation device. The optical navigation device has an illumination channel, a reference channel and an imaging channel. The reference channel has a reference feature with a known parameter. The automatic magnification adjusting method includes driving the illumination channel and the reference channel to alternatively output a detecting image and a reference image, capturing a series of navigation images consisting of the detecting image and the reference image by the imaging channel, analyzing the reference image to recognize the reference feature, calculating a compensating factor according to a detected parameter of the reference feature, and adjusting magnification of the detecting image by the compensating factor to output corresponding coordinate displacement.

22 Claims, 9 Drawing Sheets

(56) References Cited

U.S. PATENT DOCUMENTS

| | | | | |
|---|---|---|---|---|
| 2009/0108175 A1* | 4/2009 | Grot | ............ | G06F 3/0317 |
| | | | | 250/206.1 |
| 2009/0160772 A1* | 6/2009 | DePue | ............ | G06F 3/03543 |
| | | | | 345/166 |
| 2011/0148764 A1* | 6/2011 | Gao | ............ | G06F 3/0317 |
| | | | | 345/163 |
| 2014/0028868 A1* | 1/2014 | Huang | ............ | G01B 11/14 |
| | | | | 348/222.1 |
| 2014/0111437 A1* | 4/2014 | Chen | ............ | G06F 3/0317 |
| | | | | 345/166 |
| 2014/0306894 A1* | 10/2014 | Lee | ............ | G06F 3/03543 |
| | | | | 345/166 |
| 2015/0144768 A1* | 5/2015 | Lee | ............ | G06F 1/3259 |
| | | | | 250/208.1 |

* cited by examiner

OPTICAL NAVIGATION DEVICE AND RELATED AUTOMATIC MAGNIFICATION ADJUSTING METHOD

BACKGROUND OF THE INVENTION

1. Field of the Invention

The present invention relates to an optical navigation device, and more particularly, to an optical navigation device with automatic magnification adjusting function for enhanced navigation accuracy and a related automatic magnification adjusting method.

2. Description of the Prior Art

Conventional navigation device may utilize a roller mechanism or an optical sensing module to calculate coordinate variation of the navigation device relative to a supporting plane. A roller of the roller mechanism is rotated over the supporting plane by friction force, and dust is easily attached to the roller and decreases its sensitivity or responsiveness. The optical sensing module has an optical transmitter and an optical receiver. Light is emitted from the optical transmitter to project onto the plane, and the optical receiver captures the light reflected from the plane to analyze the coordinate variation due to relative motion between the sensor and object plane. However, an optical transmission path between the optical transmitter and the optical receiver may be varied due to flexion of the medium, which results in error calculation of the coordinate variation.

SUMMARY OF THE INVENTION

The present invention provides an optical navigation device with automatic magnification adjusting function for enhanced navigation accuracy and a related automatic magnification adjusting method for solving above drawbacks.

According to the claimed invention, an automatic magnification adjusting method is applied to an optical navigation device. The optical navigation device has an illumination channel, a reference channel and an imaging channel. The reference channel has one or more reference feature(s) with known parameters. The automatic magnification adjusting method includes driving the illumination channel and the reference channel to alternatively output a detecting beam and a reference beam or a patterned image, capturing a series of navigation images consisting of a detecting image formed by the detecting beam and a reference image formed by the reference beam respectively, via the imaging channel, analyzing the reference image to filter out the reference feature, calculating a compensating factor according to the detected parameter(s) of the reference feature(s), and adjusting magnification of the detecting image by the compensating factor to output corresponding coordinate displacement.

According to the claimed invention, step of calculating the compensating factor according to the detected parameter of the reference feature includes comparing the detected parameter with the known parameter, and calculating the compensating factor according to a comparison between the detected parameter and the known parameter. Step of adjusting the magnification of the detecting image by the compensating factor to output the corresponding coordinate displacement includes analyzing original coordinate displacement of the detecting image, and generating the corresponding coordinate displacement by calculation of the original coordinate displacement and the compensating factor. The reference channel is periodically driven to output the reference image, or is driven to output the reference image according to an estimation vector of the optical navigation device. The reference channel comprises a reference light source and a reference optical component, the reference feature is selectively disposed on the reference light source or the reference optical component. The known parameter is represented by dimensional characteristics such as the size and/or shape of the reference feature. The reference feature could also be represented by a plurality of reference points, and the known parameter represents a distance between the reference points.

According to the claimed invention, an optical navigation device with automatic magnification adjusting function includes an illumination channel, a reference channel, an imaging channel and a controller. The illumination channel is adapted to output a detecting beam. The reference channel is disposed by the illumination channel. The reference channel includes a reference feature with a known parameter and being adapted to output a reference beam or a patterned image. The imaging channel is disposed by the illumination channel and the reference channel for capturing the detecting image and the reference image. The controller is electrically connected to the illumination channel, the reference channel and the imaging channel. The controller is adapted to drive the illumination channel and the reference channel to alternatively output the detecting image and the reference image, to analyze the reference image to filter out the reference feature, to calculate a compensating factor according to a detected parameter of the reference feature, and to adjust magnification of the detecting image by the compensating factor so as to output corresponding coordinate displacement.

According to the claimed invention, in another embodiment, an automatic magnification adjusting method is applied to an optical navigation device. The optical navigation device has an illumination channel and an imaging channel. The illumination channel has one or more reference feature(s) with a known parameter embedded or built-in. The automatic magnification adjusting method includes capturing a detecting image output by the illumination channel by the imaging channel, analyzing the detecting image to recognize the reference feature(s), calculating a compensating factor according to a detected parameter of the reference feature(s), optionally removing the reference feature from the detected image, and adjusting magnification of the detecting image with removal of the reference feature by the compensating factor to output corresponding coordinate displacement.

According to the claimed invention, an optical navigation device with automatic magnification adjusting function includes an illumination channel, an imaging channel and a controller. The illumination channel includes a reference feature with a known parameter and is adapted to output a detecting beam to form a detecting image. The imaging channel is disposed by the illumination channel for capturing the detecting image. The controller is electrically connected to the illumination channel and the imaging channel. The controller is adapted to analyze the detecting image to recognize the reference feature, to calculate a compensating factor according to a detected parameter of the reference feature, to remove the reference feature from the detecting image, and to adjust magnification of the detecting image with removal of the reference feature by the compensating factor to output corresponding coordinate displacement.

The optical navigation device and the related automatic magnification adjusting method of the present invention effectively overcome displacement error resulted from medium-floating, the coordinate displacement is accurately calibrated to represent the cursor movement and the real track of the mouse, and the enhanced navigation accuracy of the optical navigation device can be improved for preferred market competition.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
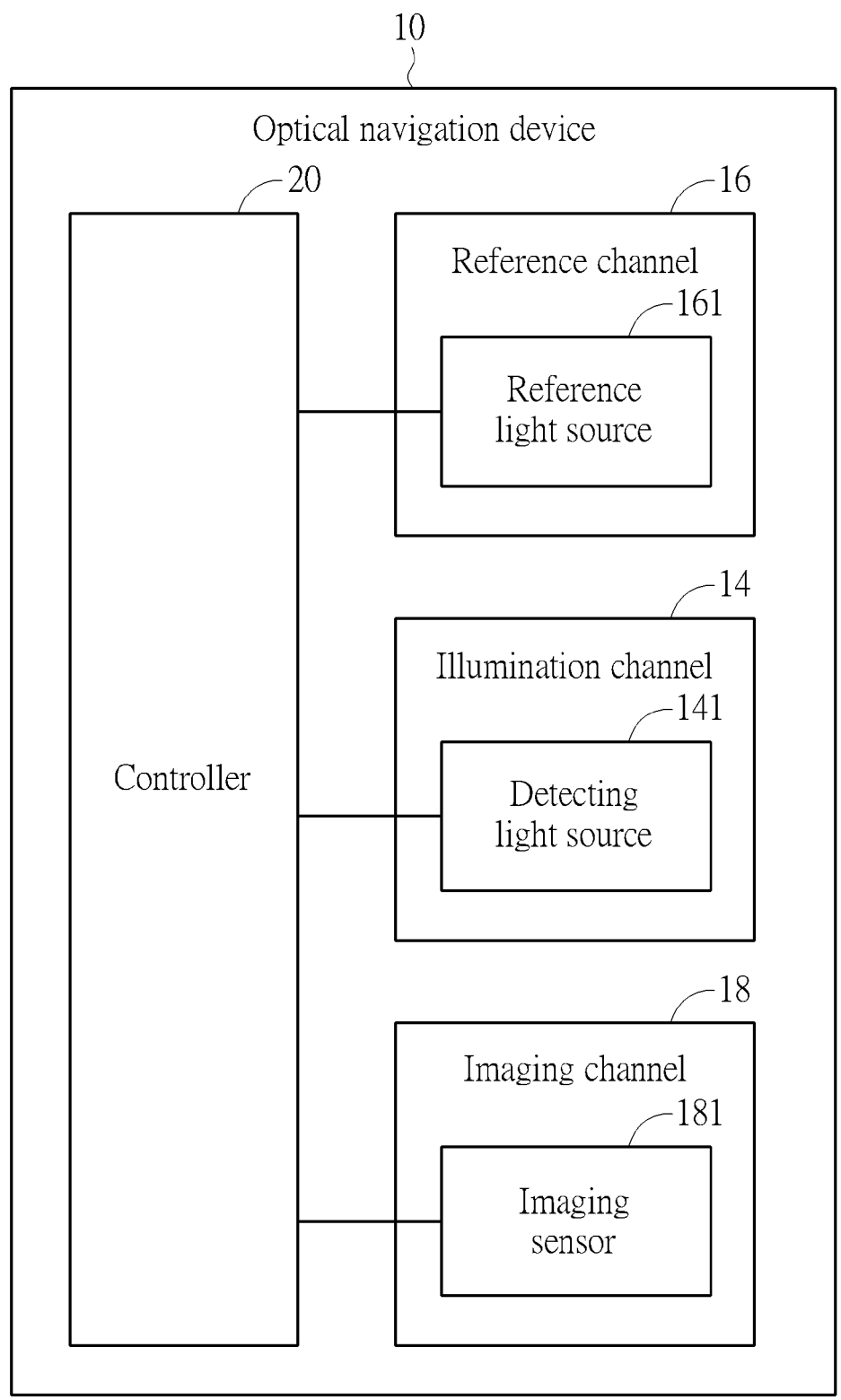
FIG. 1 is a functional block diagram of an optical navigation device according to a first embodiment of the present invention.
Figure 2:
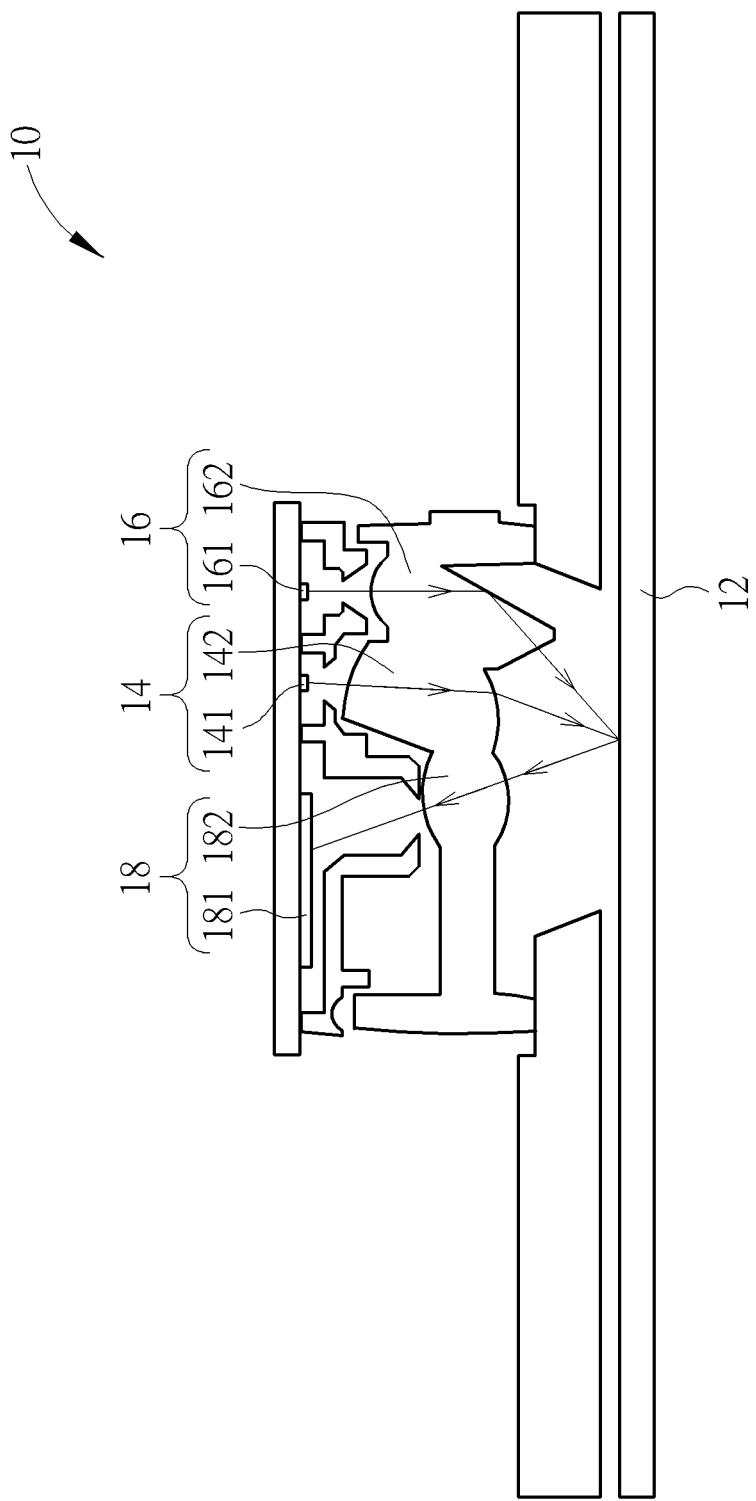
FIG. 2 is a section view of the optical navigation device according to the first embodiment of the present invention.

Please refer to FIG. 1 and FIG. 2. FIG. 1 is a functional block diagram of an optical navigation device 10 according to a first embodiment of the present invention. FIG. 2 is a section view of the optical navigation device 10 according to the first embodiment of the present invention. The optical navigation device 10 preferably can be a mouse electrically connected to a computer. The optical navigation device 10 moves above a medium 12 to control cursor movement (which represents coordinate displacement) of the mouse displayed on a screen of the computer. The medium 12 may be made of soft material or have a rough and uneven surface, and the detected cursor movement sometimes cannot accurately represent a real track of the optical navigation device 10 due to minor changes in the distance between the optical lens or sensor and the surface, which in turn, results in minor changes in the optical magnification of the imaging channel. The present invention provides an automatic magnification adjusting function applied to the optical navigation device 10 for enhanced navigation accuracy.

The optical navigation device 10 includes an illumination channel 14, a reference channel 16, an imaging channel 18 and a controller 20. The controller 20 is electrically connected to the illumination channel 14, the reference channel 16 and the imaging channel 18 for related functional control. The illumination channel 14 at least includes a detecting light source 141 and a detecting optical component 142. Light emitted from the detecting light source 141 is projected onto the medium 12 though the detecting optical component 142 to output a detecting beam to generate a detecting image. The reference channel 16 disposed by the illumination channel 14 at least includes a reference light source 161, a reference optical component 162 and a reference feature 163 with a known parameter embedded or built-in. Light emitted from the reference light source 161 is projected onto the medium 12 though the reference optical component 162 to output a reference beam (to generate a reference image) or a patterned image, and the reference image contains information of the reference feature 163. As the medium 12 is floating, a detected parameter of the reference feature 163 may be different from the known parameter, which indicates misalignment of the coordinate displacement. The imaging channel 18 disposed by the illumination channel 14 and the reference channel 16 at least includes an imaging sensor 181 and an imaging optical component 182. The imaging sensor 181 captures the detecting image and the reference image by focus of the imaging optical component 182.

Figure 3:
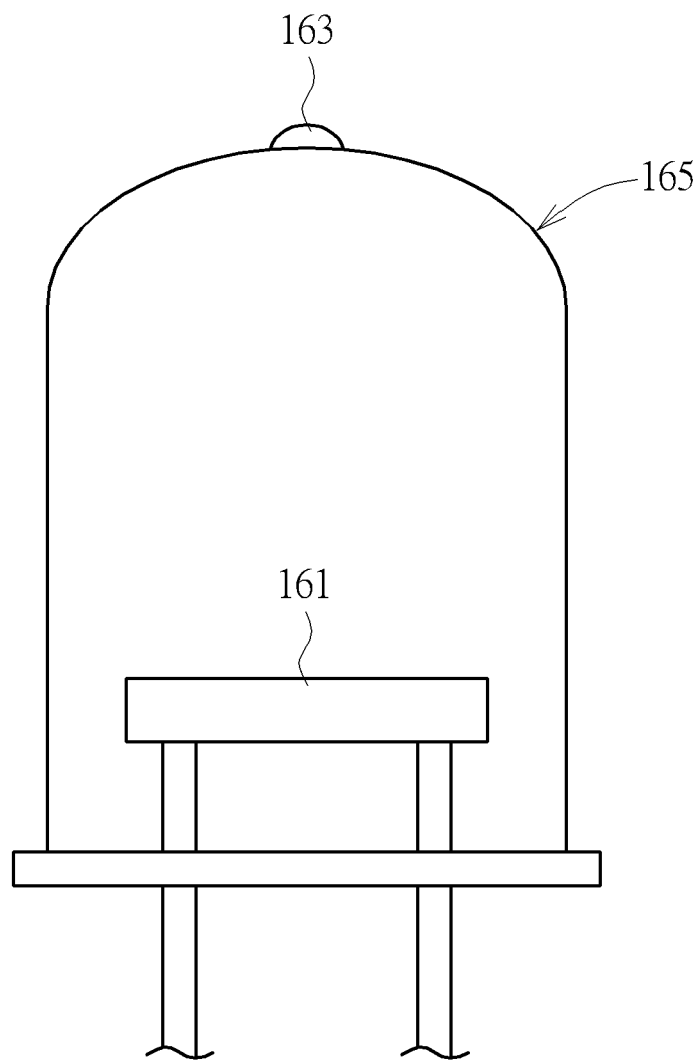
FIG. 3 and FIG. 4 respectively are diagrams of a reference feature according to different embodiments of the present invention.
Figure 4:
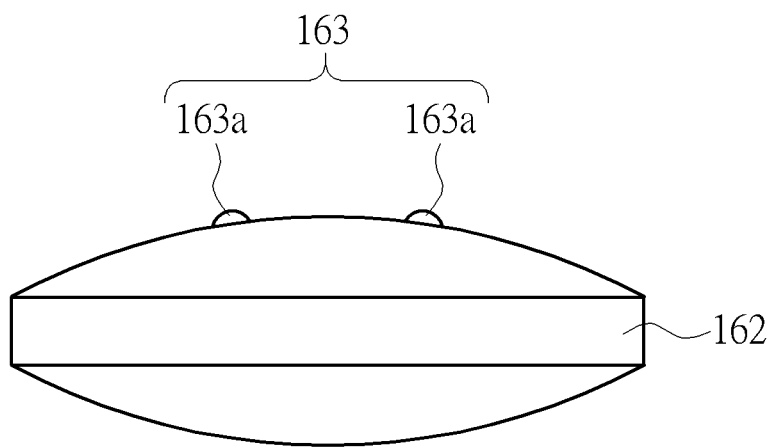

Please refer to FIG. 3 and FIG. 4. FIG. 3 and FIG. 4 respectively are diagrams of the reference feature 163 according to different embodiments of the present invention. As shown in FIG. 3, the reference feature 163 is disposed on the reference light source 161. The reference feature 163 can be a small-size optical feature such as a convex lens formed on an emitting surface 165 (which can be the transparent lampshade) of the reference light source 161, and the known parameter is represented by dimensional characteristics, such as the size (a width, a length, a radius and so on) and/or shape of the reference feature 163 (which means the convex lens). The reference feature 163 further can be represented by a plurality of reference points 163a (each reference point 163a is the convex lens distant from another one), and the known parameter represents a distance between the separated reference points 163a. The reference feature 163 not only can be the convex lens to provide a bright spot within the reference image, but also can be a shield to form a dark zone projected onto the reference image. As shown in FIG. 4, the reference points 163a of the reference feature 163 are the convex lenses or the shields disposed on the reference optical component 162 (such as the convex lens), and the known parameter may represent the size of each reference point 163a and/or the distance between the reference points 163a. Therefore, the reference feature 163 is selectively disposed on the reference light source 161 or the reference optical component 162, or on an external optical component positioned between the light source and the surface. The controller 20 determines whether the automatic magnification adjusting function is executed according to difference between the detected parameter and the known parameter of the reference feature 163.

Figure 5:
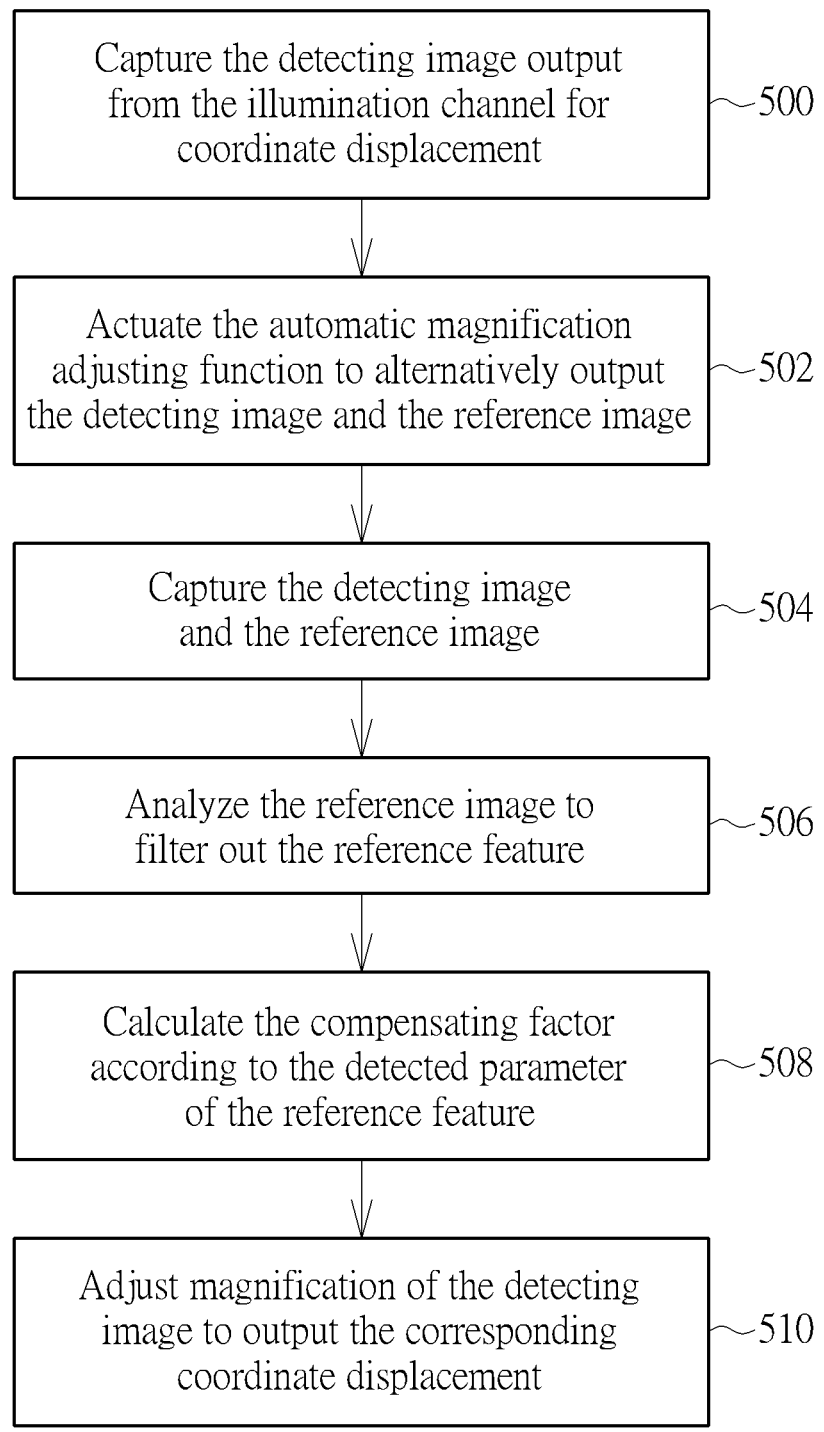
FIG. 5 is a flow chart of the automatic magnification adjusting method applied to the optical navigation device according to the first embodiment of the present invention.

Please refer to FIG. 5. FIG. 5 is a flow chart of the automatic magnification adjusting method applied to the optical navigation device 10 according to the first embodiment of the present invention. First, step 500 is executed that the controller 20 drives the illumination channel 14 to output the detecting image and further drives the imaging channel 18 to capture the detecting image for analyzing coordinate displacement of the optical navigation device 10. The coordinate displacement may not accurately express the real track of the mouse, so step 502 is executed to actuate the automatic magnification adjusting function of the optical navigation device 10. For the automatic magnification adjusting function, the controller 20 can drive the reference channel 16 to periodically output the reference image, which means each reference image is output since the detecting images with specific amount have been generated. For example, the illumination channel 14 may output twenty detecting images per second, and the reference channel 16 accordingly outputs five reference images per second. Further, the controller 20 can drive the reference channel 16 to output the reference image according to an estimation vector of the optical navigation device 10. The estimation vector is utilized to forecast the coordinate displacement by behavior inertia, and the controller 20 actuates the reference channel 16 since the estimation vector does not conform to the coordinate displacement of the detecting image. The automatic magnification adjusting function further can be artificially actuated, such as pressing a button of the optical navigation device 10, when the user feels that the coordinate displacement is unmatched with the real track of the optical navigation device 10.

Figure 6:
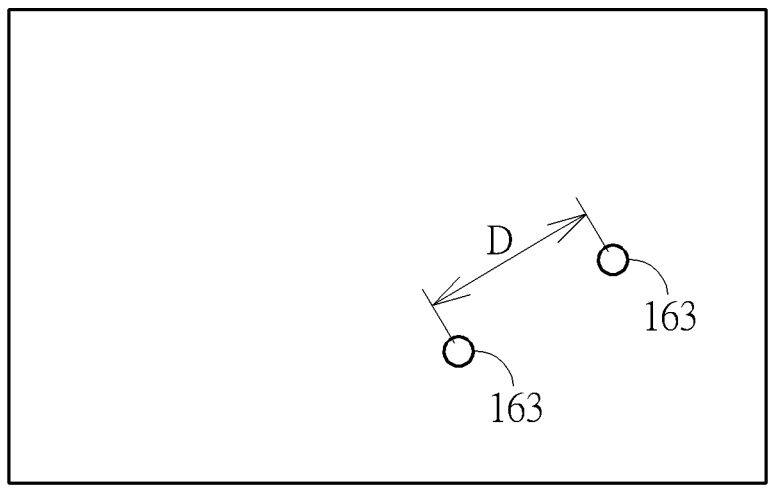
FIG. 6 is a diagram of a comparison between a detecting image and a reference image according to the first embodiment of the present invention.
Figure 6:
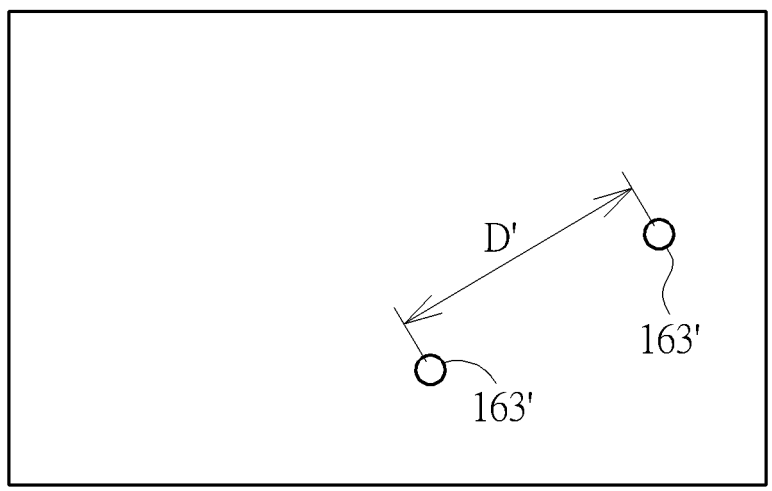

In step 502, the controller 20 drives the illumination channel 14 and the reference channel 16 to alternatively output the detecting image and the reference image because the detecting image and the reference image simultaneously captured by the imaging channel 18 cannot provide useful information. Steps 504, 506 and 508 are continuously executed and the controller 20 drives the imaging channel 18 to capture a series of navigation images consisting of the detecting image and the reference image, analyzes the reference image to recognize the reference feature 163, and calculates a compensating factor according to the detected parameter of the reference feature 163. Please refer to FIG. 6. FIG. 6 is a diagram of a comparison between the detecting image I1 and the reference image 12 according to the first embodiment of the present invention. The reference image 12 contains the reference feature 163 and the known parameter D, and the detecting image I1 contains the detected parameter D' analyzed from the deformed reference feature 163'. The controller 20 compares the detected parameter D' with the known parameter D to find out difference therebetween and calculates the compensating factor accordingly. Thus, the compensating factor may equal proportion of the detected parameter D' to the known parameter D. In next step 510, the controller 20 utilizes the compensating factor to adjust magnification of the detecting image and outputs a corresponding coordinate displacement. The corresponding coordinate displacement is accordingly amended and calibrated.

As the image comparison shown in FIG. 6, the floating medium may result in difference between the detected parameter D' and the known parameter D, the original coordinate displacement analyzed from the detecting image I1 cannot accurately express the real track of the optical navigation device 10, therefore the automatic magnification adjusting method is actuated automatically or artificially to generate the corresponding coordinate displacement by calculation of the original coordinate displacement and the compensating factor, the corresponding coordinate displacement is calibrated to indicate the real track and the optical navigation device 10 can utilize the corresponding coordinate displacement to control application program of the computer.

Figure 7:
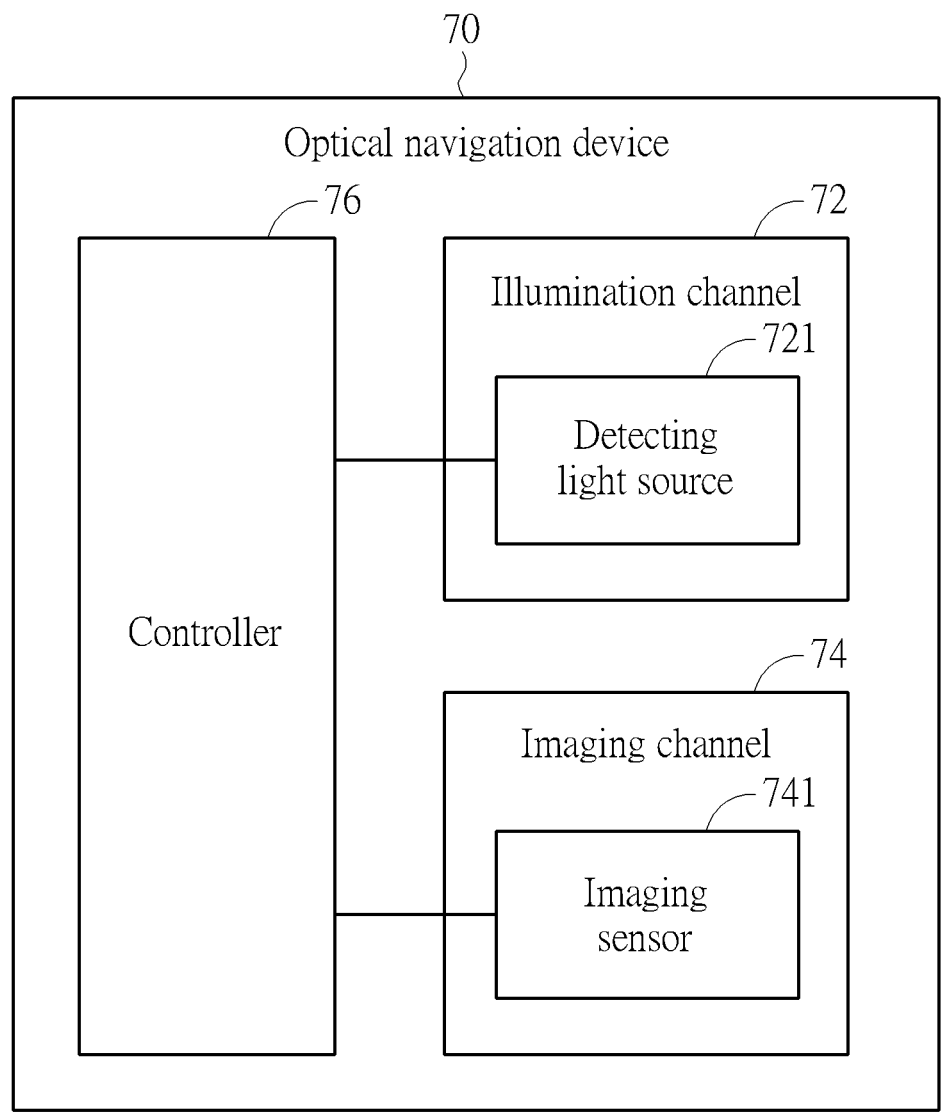
FIG. 7 is a functional block diagram of the optical navigation device according to a second embodiment of the present invention.
Figure 8:
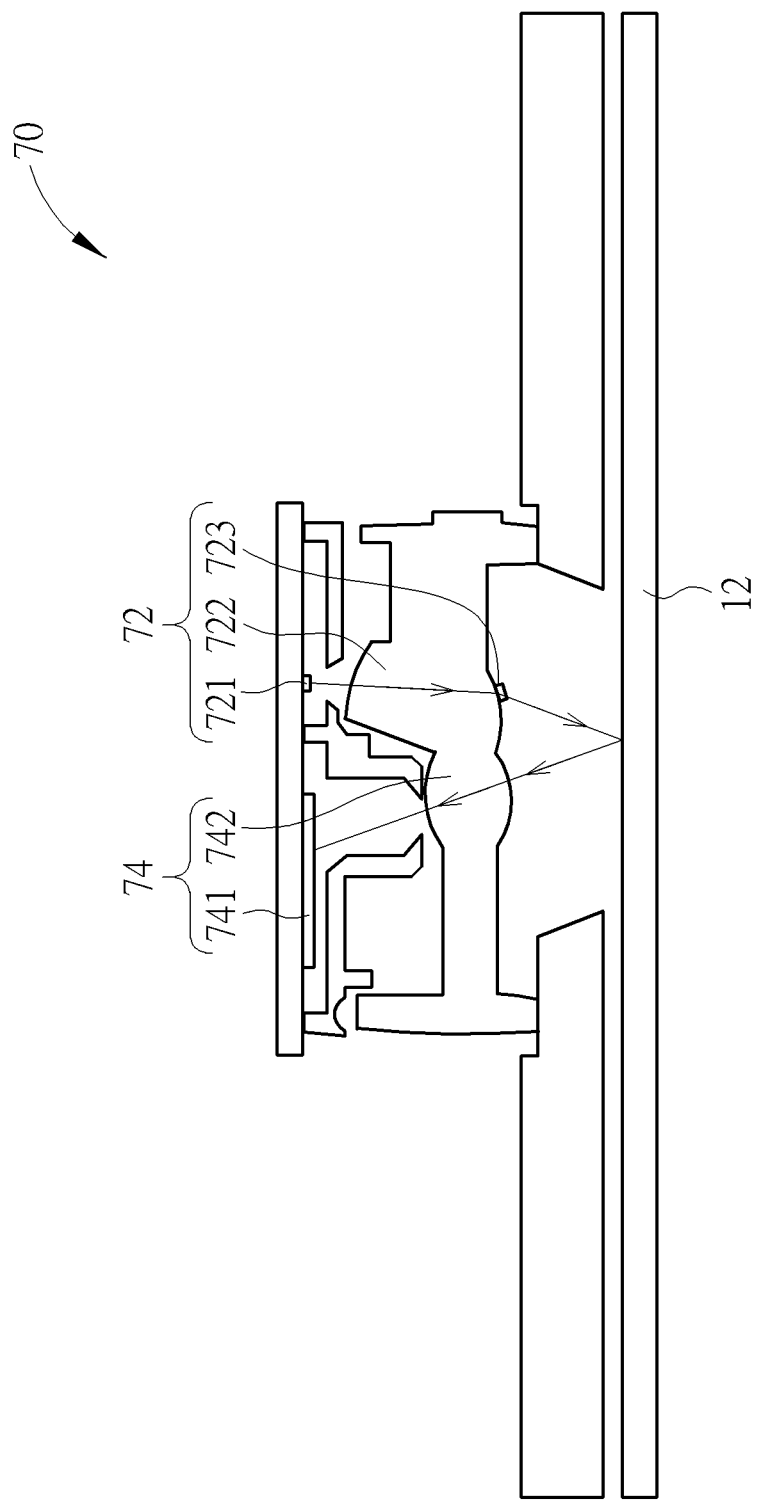
FIG. 8 is a section view of the optical navigation device according to the second embodiment of the present invention.

Please refer to FIG. 7 and FIG. 8. FIG. 7 is a functional block diagram of an optical navigation device 70 according to a second embodiment of the present invention. FIG. 8 is a section view of the optical navigation device 70 according to the second embodiment of the present invention. The optical navigation device 70 includes the illumination channel 72, the imaging channel 74 and the controller 76. The illumination channel 72 at least includes the detecting light source 721, the detecting optical component 722 and the reference feature 723 with the known parameter. The imaging channel 74 at least includes the imaging sensor 741 and the imaging optical component 742. The controller 76 is electrically connected to the detecting light source 721 and the imaging sensor 741. The reference feature 723 has properties similar to the above-mentioned reference feature 163, and a detailed description is omitted herein for simplicity. For example, the reference feature 723 can be the convex lens or the shield selectively disposed on the detecting light source 721 or the detecting optical component 722.

Because the reference feature 723 is disposed on the detecting light source 721 or the detecting optical component 722, every detecting image output from the illumination channel 72 contains the reference feature 723, and the optical navigation device 70 can calibrate the coordinate displacement within each detecting image by the automatic magnification adjusting function. It should be mentioned that the detecting image captured by the imaging channel 74 always has one or more fixed pattern due to projection of the reference feature 723. The fixed pattern is noise in image process and must be ignored when the controller 76 analyzes the detecting image to calculate the coordinate displacement of the optical navigation device 70. The original coordinate displacement is calculated by removal of the reference feature 723 from the detecting image, when the detected parameter within the detecting image does not conform to the known parameter of the reference feature 723, the controller 76 adjusts the magnification by the compensating factor to transform the original coordinate displacement into the corresponding coordinate displacement, so that the corresponding coordinate displacement is calibrated to indicate the real track of the optical navigation device 70.

Figure 9:
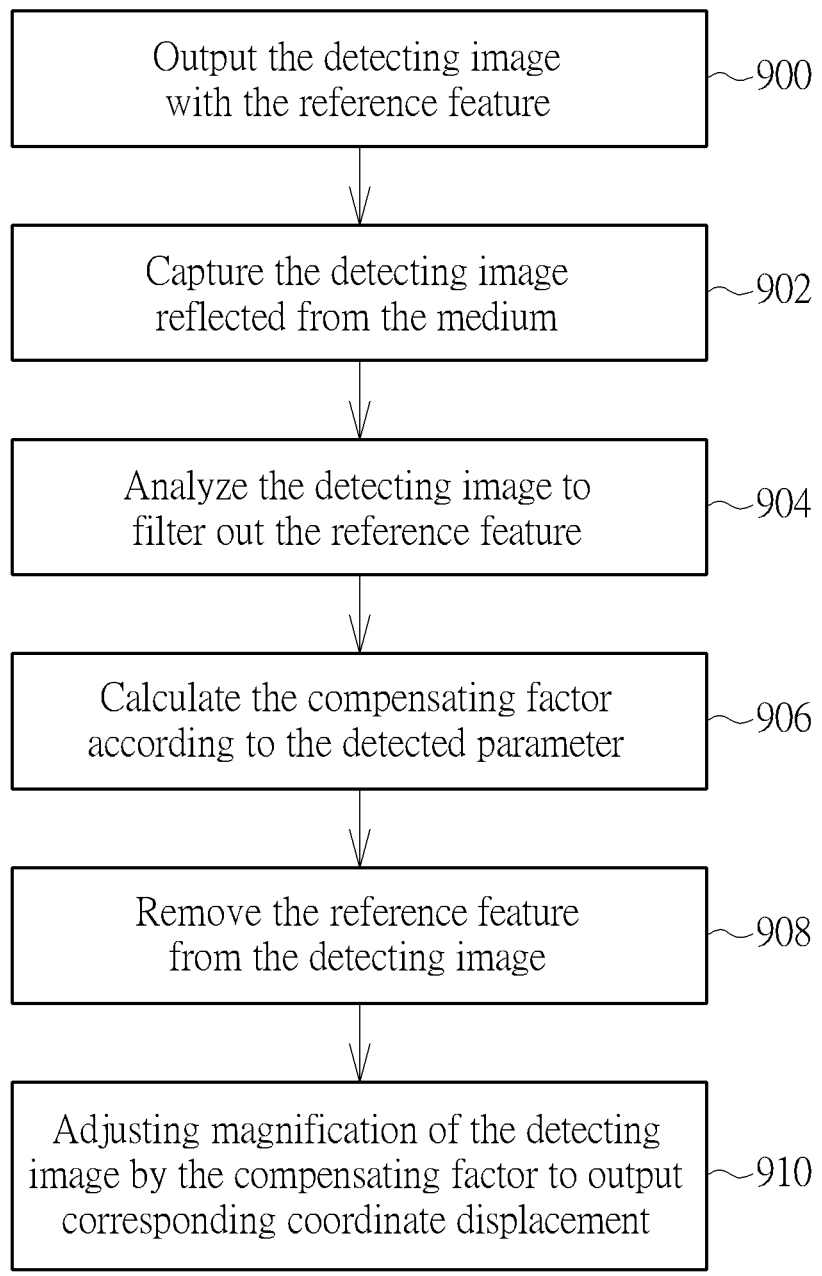
FIG. 9 is a flow chart of the automatic magnification adjusting method applied to the optical navigation device according to the second embodiment of the present invention.

Please refer to FIG. 9. FIG. 9 is a flow chart of the automatic magnification adjusting method applied to the optical navigation device 70 according to the second embodiment of the present invention. First, steps 900 and 902 are executed that the controller 76 drives the illumination channel 72 to output the detecting image and drives the imaging channel 74 to capture the detecting image reflected from the medium 12. Coordinate displacement of the detecting image is analyzed and not output yet. The automatic magnification adjusting function can be applied to any detecting image because every detecting image contains the reference feature 723. In step 904, the controller 76 analyzes the detecting image to recognize the reference feature 723. Steps 906 and 908 are executed in unlimited sequence. The controller 76 calculates the compensating factor according to the detected parameter of the reference feature 723, and then optionally removes the reference feature 723 from the detected image (formed by the detecting beam) to calculate the original coordinate displacement. Final, step 910 is executed and the controller 76 adjusts magnification of the original coordinate displacement by the compensating factor, so as to output the corresponding coordinate displacement on behalf of the real track of the optical navigation device 70.

In the present invention, the first embodiment utilizes the reference channel to project the reference feature onto the medium, the detecting image output from the illumination channel has not noise of reference feature, every area upon the detecting image can be applied to calculate the coordinate displacement, the reference image and the detecting image are generated intermittently, the imaging channel captures the reference image to obtain the compensating factor and accordingly adjust magnification of the detecting image by the compensating factor to output the coordinate displacement matched with the real track of the optical navigation device. The second embodiment disposes the reference feature on the illumination channel instead of the additional reference channel, an area of the reference feature within the detecting image is ignored to calculate the original coordinate displacement which is not output yet, the detected parameter of the reference feature is analyzed to calibrate the original coordinate displacement, and then the coordinate displacement matched with the real track of the optical navigation device can be output for computer control. Comparing to the prior art, the optical navigation device and the related automatic magnification adjusting method of the present invention effectively overcome displacement error resulted from medium-floating, the coordinate displacement is accurately calibrated to represent the cursor movement and the real track of the mouse, and the enhanced navigation accuracy of the optical navigation device can be improved for preferred market competition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An automatic magnification adjusting method applied to an optical navigation device, the optical navigation device having an illumination channel, a reference channel and an imaging channel, the reference channel having at least one reference feature with a known parameter, the reference feature comprising a plurality of reference points, and the known parameter representing a distance between the reference points, the automatic magnification adjusting method comprising:
   driving the illumination channel and the reference channel to alternatively output a detecting beam and a reference beam;
   capturing a series of navigation images consisting of a detecting image formed by the detecting beam and a reference image formed by the reference beam via the imaging channel;
   analyzing the reference image to recognize the reference feature;
   calculating a compensating factor according to a detected parameter of the reference feature; and
   adjusting magnification of the detecting image by the compensating factor to output corresponding coordinate displacement.

2. The automatic magnification adjusting method of claim 1, wherein calculating the compensating factor according to the detected parameter of the reference feature comprises:
   comparing the detected parameter with the known parameter; and
   calculating the compensating factor according to a comparison between the detected parameter and the known parameter.

3. The automatic magnification adjusting method of claim 1, wherein adjusting the magnification of the detecting image by the compensating factor to output the corresponding coordinate displacement comprises:
   analyzing original coordinate displacement of the detecting image; and
   generating the corresponding coordinate displacement by calculation of the original coordinate displacement and the compensating factor.

4. The automatic magnification adjusting method of claim 1, wherein the reference channel is periodically driven to output the reference image, or is driven to output the reference image according to an estimation vector of the optical navigation device.

5. The automatic magnification adjusting method of claim 1, wherein the reference channel comprises a reference light source and a reference optical component, the reference feature is selectively disposed on the reference light source or the reference optical component.

6. The automatic magnification adjusting method of claim 1, wherein the known parameter is represented by dimensional characteristics.

7. An optical navigation device with automatic magnification adjusting function, the optical navigation device comprising:
   an illumination channel for outputting a detecting beam;
   a reference channel disposed by the illumination channel, the reference channel comprising a reference feature with a known parameter and being adapted to output a reference beam, the reference feature comprising a plurality of reference points, and the known parameter representing a distance between the reference points;
   an imaging channel disposed by the illumination channel and the reference channel for capturing a detecting image formed by the detecting beam and a reference image formed by the reference beam;
   a controller electrically connected to the illumination channel, the reference channel and the imaging channel, the controller being adapted to drive the illumination channel and the reference channel to alternatively output the detecting image and the reference image, to analyze the reference image to recognize the reference feature, to calculate a compensating factor according to a detected parameter of the reference feature, and to adjust magnification of the detecting image by the compensating factor so as to output corresponding coordinate displacement.

8. The optical navigation device of claim 7, wherein the controller compares the detected parameter with the known parameter and calculates the compensating factor according to a comparison between the detected parameter and the known parameter, the controller further analyzes original coordinate displacement of the detecting image and generates the corresponding coordinate displacement by calculation of the original coordinate displacement and the compensating factor.

9. The optical navigation device of claim 7, wherein the controller drives the reference channel to periodically output the reference image, or drives the reference channel to output the reference image according to an estimation vector of the optical navigation device.

10. The optical navigation device of claim 7, wherein the reference channel comprises a reference light source and a reference optical component, the reference feature is selectively disposed on the reference light source or the reference optical component.

11. The optical navigation device of claim 10, wherein the reference feature is a small-size convex lens formed on the reference optical component or an emitting surface of the reference light source.

12. The optical navigation device of claim 7, wherein the known parameter is represented by dimensional characteristics.

13. An automatic magnification adjusting method applied to an optical navigation device, the optical navigation device having an illumination channel and an imaging channel, the illumination channel having a reference feature with a known parameter, the reference feature comprising a plurality of reference points, and the known parameter representing a distance between the reference points, the automatic magnification adjusting method comprising:

capturing a detecting image output by the illumination channel by the imaging channel;

analyzing the detecting image to recognize the reference feature;

calculating a compensating factor according to a detected parameter of the reference feature;

removing the reference feature from the detecting image; and adjusting magnification of the detecting image with removal of the reference feature by the compensating factor to output corresponding coordinate displacement.

14. The automatic magnification adjusting method of claim 13, wherein calculating the compensating factor according to the detected parameter of the reference feature comprises:

comparing the detected parameter with the known parameter; and calculating the compensating factor according to a comparison between the detected parameter and the known parameter.

15. The automatic magnification adjusting method of claim 13, wherein adjusting the magnification of the detecting image by the compensating factor to output the coordinate displacement comprises:

analyzing original coordinate displacement of the detecting image; and generating the corresponding coordinate displacement by calculation of the original coordinate displacement and the compensating factor.

16. The automatic magnification adjusting method of claim 13, wherein the illumination channel comprises a detecting light source and a detecting optical component, the reference feature is selectively disposed on the detecting light source or the detecting optical component.

17. The automatic magnification adjusting method of claim 13, wherein the known parameter is represented by dimensional characteristics.

18. An optical navigation device with automatic magnification adjusting function, the optical navigation device comprising:

an illumination channel comprising a reference feature with a known parameter and being adapted to output a detecting beam to form a detecting image, the reference feature comprising a plurality of reference points, and the known parameter representing a distance between the reference points;

an imaging channel disposed by the illumination channel for capturing the detecting image; and a controller electrically connected to the illumination channel and the imaging channel, the controller being adapted to analyze the detecting image to recognize the reference feature, to calculate a compensating factor according to a detected parameter of the reference feature, to remove the reference feature from the detecting image, and to adjust magnification of the detecting image with removal of the reference feature by the compensating factor to output corresponding coordinate displacement.

19. The optical navigation device of claim 18, wherein the controller compares the detected parameter with the known parameter and calculates the compensating factor according to a comparison between the detected parameter and the known parameter, the controller further analyzes original coordinate displacement of the detecting image and generates the corresponding coordinate displacement by calculation of the original coordinate displacement and the compensating factor.

20. The optical navigation device of claim 18, wherein the illumination channel comprises a detecting light source and a detecting optical component, the reference feature is selectively disposed on the detecting light source or the detecting optical component.

21. The optical navigation device of claim 20, wherein the reference feature is a small-size convex lens formed on the detecting optical component or an emitting surface of the detecting light source.

22. The optical navigation device of claim 18, wherein the known parameter is represented by dimensional characteristics.

* * * * *